(12) United States Patent
Ando et al.

(10) Patent No.: US 7,279,523 B2
(45) Date of Patent: Oct. 9, 2007

(54) 2-CYANOACRYLATE-BASED COMPOSITION, METHOD AND AGENT FOR EVALUATING CURING THEREOF

(75) Inventors: Yushi Ando, West Jefferson, OH (US); Yoshiharu Ohashi, Nagoya (JP)

(73) Assignee: Toagosei Co., Ltd., Tokyo (JP)

( * ) Notice: Subject to any disclaimer, the term of this patent is extended or adjusted under 35 U.S.C. 154(b) by 30 days.

(21) Appl. No.: 10/494,329

(22) PCT Filed: Nov. 4, 2003

(86) PCT No.: PCT/JP03/14058

§ 371 (c)(1),
(2), (4) Date: Apr. 30, 2004

(87) PCT Pub. No.: WO2004/041876

PCT Pub. Date: May 21, 2004

(65) Prior Publication Data

US 2004/0254272 A1    Dec. 16, 2004

(30) Foreign Application Priority Data

Nov. 6, 2002 (JP) ............................. 2002-322728

(51) Int. Cl.
- C08F 8/30 (2006.01)
- C08F 36/18 (2006.01)
- C08K 5/23 (2006.01)
- C09B 67/00 (2006.01)

(52) U.S. Cl. ............ 524/555; 524/715; 524/722; 524/761; 8/597; 8/587; 8/594

(58) Field of Classification Search ........ 8/552, 8/582, 597, 587, 594; 252/408.1; 526/328; 524/81, 555, 715, 722, 761; 558/307
See application file for complete search history.

(56) References Cited

U.S. PATENT DOCUMENTS

| | | | |
|---|---|---|---|
| 3,742,018 A | | 6/1973 | O'Sullivan |
| 4,149,852 A | * | 4/1979 | Tiru et al. ............ 436/163 |
| 4,272,898 A | | 6/1981 | Tansill |
| 4,980,086 A | | 12/1990 | Hiraiwa et al. |
| 5,561,173 A | | 10/1996 | Dry |
| 5,575,841 A | | 11/1996 | Dry |
| 5,660,624 A | | 8/1997 | Dry |
| 5,803,963 A | | 9/1998 | Dry |
| 5,877,230 A | * | 3/1999 | Kutal ................ 522/66 |
| 5,989,334 A | | 11/1999 | Dry |
| 6,261,360 B1 | | 7/2001 | Dry |
| 6,518,330 B2 | | 2/2003 | White et al. |
| 6,518,356 B1 | * | 2/2003 | Friese et al. ........... 524/580 |
| 6,527,849 B2 | | 3/2003 | Dry |
| 6,689,826 B2 | * | 2/2004 | Wojciak ............. 524/107 |
| 2001/0050032 A1 | | 12/2001 | Dry |
| 2003/0065069 A1 | * | 4/2003 | Wojciak ............. 524/107 |
| 2004/0034116 A1 | * | 2/2004 | Wojciak ............. 522/71 |

FOREIGN PATENT DOCUMENTS

| | | | |
|---|---|---|---|
| EP | 342965 | * | 11/1989 |
| EP | 0 492 830 A2 | | 7/1992 |
| JP | 57-053577 A | | 3/1982 |
| JP | 62-081468 A | | 4/1987 |
| JP | 62-100567 A | | 5/1987 |
| JP | 63-035674 A | | 2/1988 |
| JP | 02-202567 A | | 8/1990 |
| JP | 04-335038 A | | 11/1992 |
| JP | 10-140091 | * | 11/1996 |
| JP | 10-160723 A | | 6/1998 |
| JP | H10-176142 A | | 6/1998 |
| WO | WO 02/064653 A2 | | 8/2002 |
| WO | WO 02/064653 A3 | | 8/2002 |

OTHER PUBLICATIONS www.tokyokasei.com.jp/class.66.pdf- no date available, titled "pH Indicators".*
English language translation of JP 10-160723, Jun. 19, 1998.*
Dry, Passive Smart Materials for Sensing and Actuation, Proceedings of the Conference on Recent Advances in Adaptive and Sensory Materials and their Applications, edited by Rogers and Rogers, Virginia Polytechnic Institiute and State University, Blacksburg, VA, pp. 207-223 (Apr. 27-29, 1992).
Dry, Smart materials which sense, activate and repair damage; hollow porous fibers in composites release chemicals from fibers for self-healing, damage prevention, and/or dynamic control, Culshaw et al. (Editors), Proceedings on 1st European Conf. On Smart Structures and Materials, Glasgow, Scotland, Session (11), pp. 367-371 (May 12-14, 1992).
Dry, Smart Materials for sensing and/or remedial action to reduce damage to materials, Knowles (editor) Proceedings of the ADPA/AIAA/ASME/SPIE Conf., Nov. 4-8, 1991, Alexandria, VA, 191-195 (1992).
Dry and Sottos, Passive smart self-repair in polymer matrix composite materials, SPIE vol. 1916, pp. 438-444 (1993).
Dry, Matrix cracking repair and filling using active and passive modes for smart timed release of chemicals into cement matricies, Smart Mater. Struct. 3:118-123 (1994).

(Continued)

*Primary Examiner*—Lorna M. Douyon
*Assistant Examiner*—Jaison Thomas
(74) *Attorney, Agent, or Firm*—Fitch Even Tabin & Flannery

(57) ABSTRACT

A 2-cyanoacrylate-based composition comprises a coloring material that changes color with curing of 2-cyanoacrylate. The composition has good visibility and excellent workability as it is colored before curing, and changes color with curing as it becomes colorless or light-colored after curing, thereby providing bonded, filled or surface treated portions with good appearance.

12 Claims, No Drawings

OTHER PUBLICATIONS

Dry, Structural Control During and After Seismic Events by Timed Release of Chemicals for Damage Repair in Composites Made of Concrete or Polymers, First World Conference on Structural Control, Los Angeles, CA, Aug. 3-5, 1994, Proceedings, vol. 2, pp. TA1-60 to TA165.

Dry, Smart Multiphase composite materials which repair themselves by a release of liquids which become solids, SPIE 2189:62-70 (1994).

Dry, Adhesive Liquid Core Optical Fibers for Crack Detection & Repairs in Polymer and Concrete Matricies, SPIE 2444:410-413 (1995).

Dry, Procedures developed for self-repair of polymer matrix composite materials, Composite Structures 35:263-269 (1996).

Dry, Crack and damage assessment in concrete and polymer matrices using liquids released internally from hollow optical fibers, SPIE:2718:448-451 (1996).

Dry, Self-repair of Polymer Matrix Composites for use as Infrastructure Materials, Saadatmanesh et al. (Editors), Proceedings of the Second International Congress on Composites in Infrastructure Jan. 5-7, 1998, vol. 1, pp. 80-85 (1998).

Jarikov et al., "Anionic Photopolymerization of Methyl 2-Cyanoacrylate and Simultaneous Color Formation," Macromolecules 2000, vol. 33, No. 21, pp. 7761-7764 (Oct. 2000).

* cited by examiner

2-CYANOACRYLATE-BASED COMPOSITION, METHOD AND AGENT FOR EVALUATING CURING THEREOF

CROSS-REFERENCED APPLICATIONS

This application is the National Stage of International Application PCT/JP03/14058, filed Nov. 4, 2003, the complete disclosure of which is incorporated herein by reference, which designated the U.S. and that International Application was not published under PCT Article 21(2) in English.

TECHNICAL FIELD

The present invention relates to a 2-cyanoacrylate-based composition that changes color with curing, in particular to a 2-cyanoacrylate-based composition that, before curing, is colored so that portions subjected to adhesion, filling or surface treatment can be easily visually recognized and, after curing, becomes colorless or light-colored so that portions subjected to adhesion, filling or surface treatment have good appearance, and to a method for determining the curing of the 2-cyanoacrylate-based composition and an agent for determining the curing of the same.

BACKGROUND ART

As 2-cyanoacrylates are instantaneously anionically polymerized to form rigid polymers, they are widely utilized as instantaneous adhesives, rapid-curing fillers and the like in various industries, medical fields, leisure fields and houses. Cured products of 2-cyanoacrylates are generally transparent and colorless and have advantages in that portions subjected to adhesion, filling or surface treatment are inconspicuous and do not spoil appearance.

However, as 2-cyanoacrylates are transparent and colorless even in liquid form during coating and filling, they have disadvantages in terms of handling in that sites which have been coated or filled with them are hard to be distinguished and the amount of coating is difficult to be determined.

Conventionally, various methods have been investigated in order to solve these problems. For example, these methods include a method in which coloring materials are added to 2-cyanoacrylates (U.S. Pat. No. 2,784,127 specification (column 5)) and a method in which anthraquinone-based coloring materials that have good color development properties, are blended with 2-cyanoacrylates (U.S. Pat. No. 3,699,076 specification (columns 3-5 and 8)). In addition, they include a method in which coloring materials having a structure that emits a specific fluorescence are used so as to visually recognize it by irradiation with ultraviolet rays (U.S. Pat. No. 4,405,750 specification (columns 4-5)) and a method in which coloring is carried out by adding salts of basic dyes with various acids (Japanese Patent Laid-Open No. 52-65531 (claims, and page 3)).

When 2-cyanoacrylate-based compositions are used for adhesion, filling, surface treatment or the like, it is of interest whether or not coated adhesives and cured products, particularly their portions or parts that will be shown or exposed after curing can be clearly determined visually (hereinafter referred to as "visibility"), in as much as the present invention focuses on appearance after curing. Namely, for applications in which workability is of interest, it is preferred that 2-cyanoacrylates are colored before curing to an extent that visibility is good. On the other hand, it is preferred that cured products and their exposed parts are inconspicuous, that is, transparent and colorless or nearly colorless, in consideration of appearance after curing.

However, with regard to the incorporation of coloring materials, conventional visible coloring materials improve the visibility during coating, but are still disadvantageous in that they also color cured products and spoil the appearance. Moreover, fluorescent coloring materials express visibility by irradiating them with ultraviolet rays, but have several defects, for example, in that an ultraviolet ray irradiation apparatus is needed and ultraviolet rays may affect human bodies.

DISCLOSURE OF THE INVENTION

It is an object of the present invention to eliminate the above disadvantages of prior art and provide a 2-cyanoacrylate-based composition that changes color with curing, namely, is colored before curing so as to provide excellent visibility and workability, and is colorless or light-colored after curing so as to provide excellent appearance for portions which have been bonded, filled or surface treated, as well as to provide a method for determining the curing of the 2-cyanoacrylate-based composition and an agent for determining the curing of the same composition.

As a result of intensive researches for the purpose of solving the above described problems, the present inventors have completed the present invention by finding out that a 2-cyanoacrylate-based composition with which a specific coloring material is blended is colored before curing and turns colorless or light-colored after curing, thereby surprisingly alleviating all the above problems.

Namely, the present invention provides a composition comprising a 2-cyanoacrylate with which a coloring material that changes color with curing of the 2-cyanoacrylate is blended. It should be noted in the present invention that the sentence "change(s) color with curing of the 2-cyanoacrylate" means that color changes as the 2-cyanoacrylate-based composition is cured, namely in the course of the curing process of the 2-cyanoacrylate-based composition.

BEST MODE FOR CARRYING OUT THE INVENTION

Hereinafter, the present invention will be described in detail.

Coloring Materials

As the coloring material for use in the present invention, pH indicators that change color with change of pH or compounds having such properties are preferably used. Among them, those having a color change region in a range of pH 1 to 4 are more preferable since the color change is possible when 2-cyanoacrylate is cured. Among them, particularly preferred are those having an indicator color change region that partly or wholly falls under pH 1 to 4 such that a color of good visibility is exhibited on the acidic side whilst it turns, on the alkaline side, completely colorless or lighter color than the acidic side. When such coloring materials are used, color change is possible in a manner that a color is visible before the change of color, and the color becomes less visible, namely, colorless or light-colored after the change of color.

Furthermore, not only the 2-cyanoacrylate-based composition that is colored before curing and turns colorless or light-colored after curing, which is the original object of the present invention, but also a 2-cyanoacylate-based composition that is colorless or light-colored before curing and turns colored after curing or a 2-cyanoacrylate-based composition that is colored both before and after curing but exhibits one color before curing and another color after curing can be used for various purposes. These compositions can be obtained by selecting and incorporating a suitable one from the coloring materials that change color with pH.

For example, when a coloring material, which has no pH indication color on the acidic side and thus is transparent and colorless upon addition to a 2-cyanoacrylate that has not been cured, but develops color at pH 2.5 to 5, is used, the resultant 2-cyanoacrylate turns from colorless to colored when it is cured.

Concrete examples of the coloring material for use in the present invention include bromocresol green, bromocresol purple, bromothymol blue, bromophenol blue, bromophenol red, m-cresol purple, o-cresol red, methyl yellow, methyl red, methyl orange, methyl violet, pentamethoxy red, pyrogallol red, thymol blue, and the like.

Among them, a preferred type is a coloring material that turns light-colored after 2-cyanoacrylate is cured compared to before curing, and includes methyl yellow, methyl red and the like. A more preferred type is a coloring material that turns colorless after curing, which includes pentamethoxy red and the like.

These coloring materials can be used as agents for determining curing of 2-cyanoacrylates. In addition, determination of the curing of 2-cyanoacrylates can be made by blending these coloring materials with 2-cyanoacrylates.

Amount of the coloring material to be blended with the 2-cyanoacrylate can not generally be defined, as extent of coloring varies depending upon types of coloring materials, but is, in ordinary cases, preferably from 0.5 to 1,500 ppm by weight (hereinafter referred only to ppm unless otherwise specified), more preferably from 5 to 500 ppm. A larger amount than above adversely affects curability of 2-cyanoacrylates and a smaller amount than above is not preferable due to too weak coloring and less visibility.

2-Cyanoacrylates

2-Cyanoacrylates whose workability can be improved using the coloring material of the present invention are cyanoacrylate derivatives which are used for adhesive, filling, surface treatment agents or the like.

Examples thereof include methyl-2-cyanoacrylate, ethyl-2-cyanoacrylate, propyl-2-cyanoacrylate, isopropyl-2-cyanoacrylate, butyl-2-cyanoacrylate, isobutyl-2-cyanoacrylate, amyl-2-cyanoacrylate, hexyl-2-cyanoacrylate, cyclohexyl-2-cyanoacrylate, octyl-2-cyanoacrylate, 2-ethylhexyl-2-cyanoacrylate, allyl-2-cyanoacrylate, propargyl-2-cyanoacrylate, phenyl-2-cyanoacrylate, benzyl-2-cyanoacrylate, methoxyethyl-2-cyanoacrylate, ethoxyethyl-2-cyanoacrylate, tetrahydrofulfuryl-2-cyanoacrylate, 2-chloroethyl-2-cyanoacrylate, 3-chloropropyl-2-cyanoacrylate, 2-chlorobutyl-2-cyanoacrylate, 2,2,2-trifluoroethyl-2-cyanoacrylate, hexafluoroisopropyl-2-cyanoacrylate, or the like.

These 2-cyanoacrylates may be used singly to prepare adhesive, filling or surface treatment compositions or agents, or two or more 2-cycanoacrylates may be used as an admixture.

Other Components

The 2-cyanoacrylate-based composition of the present invention comprises a coloring material and a 2-cyanoacrylate as essential components. However, when the composition is used as an adhesive, it is supplemented with an anion polymerization stabilizer, a radical polymerization stabilizer, a thickener, a curing accelerator, a plasticizer and a thixotropic agent, as required.

The anion polymerization stabilizer may be an anion polymerization stabilizer that is conventionally known in the art, and includes sulfur dioxide, nitrogen monoxide, hydrogen fluoride, sultone compounds, $BF_3$-ether complex, $BF_3$-aceticacid complex or $BF_3$-methanol complex, methansulfonic acid, p-toluenesulfonic acid and the like. Generally, the amount thereof to be added is preferably in the range from 1 ppm by weight to 1% by weight. As described later, these compounds greatly influence the performance of change of color, and thus it is important to select a suitable amount depending on coloring materials to be combined.

The anion polymerization stabilizers are generally acidic compounds. Besides, the 2-cyanoacrylate-based composition contains various acidic compounds such as impurities derived from depolymerization catalysts mixed in the synthetic process, and impurities derived from distillation stabilizers. The color change of the pH indicators used in the present invention is affected by the type, the amount to be added or the like of these acidic compounds. For example, when $BF_3$-ether complex, $BF_3$-acetic acid complex, $BF_3$-methanol complex or the like is used as an anion polymerization stabilizer, the pH required for coloring materials tends to shift a little to the acidic side (that is, the color change region shifts to the acidic side). Furthermore, the acidic compounds greatly influence curing speed and product life of 2-cyanoacrylate-based compositions. Thus, it is important to select their suitable amounts to be added and combination taking into account target curing performance, product life, color change performance and various other aspects.

The radical polymerization stabilizer may be a radical polymerization stabilizer that is conventionally known in the art, and specifically includes hydroquinone, hydroquinone monomethyl ether, catechol, pyrogallol and the like. Preferable amount thereof to be added is in the range of 1 ppm by weight to 1% by weight.

In order to increase adhesion speed, anion polymerization accelerators may be added, which include polyalkylene oxides and their derivatives, crown ethers and their derivatives, silacrown ethers and their derivatives, calixarene derivatives, thiacalixarene derivatives and the like.

The thickener may be a thickener that is conventionally known in the art, and specifically includes polymethylmethacrylate, methyl methacrylate/acrylate copolymers, methyl methacrylate/methacrylate copolymers, cellulose derivatives and the like. Preferable amount thereof to be added is in the range of 0.1 to 20% by weight.

The plasticizer may be a plasticizer that is conventionally known in the art, and includes alkyl phthalates, specific multifunctional (meth)acrylates and the like. Preferable amount thereof to be added is in the range of 0.01 to 30% by weight.

The thixotropic agent may be a thixotropic agent that is conventionally known in the art, and specifically includes hydrophobic silica. Preferable amount thereof to be added is in the range of 0.1 to 20% by weight.

Besides, adhesion-imparting agents, perfumes, fillers, crosslinking agents, tougheners, polymerization initiators, organic solvents or the like are added depending on purposes. All the known techniques concerning these additives can be applied to the 2-cyanoarylate-based composition of the present invention.

The 2-cyanoacrylate-based composition preferred in the present invention is characterized in that it is colored before curing and turns colorless or light-colored after curing. For example, when-sulfur dioxide is used as an anion polymerization stabilizer, this change is considered due to the fact that pH in the system changes from a pH of approximately 2 to 3 before curing to a pH of approximately 3.5 to 4.5 after curing, in view of change of an added indicator. This change of pH is mainly caused by the fact that water content is maintained in the range of from several tens to several hundreds ppm before curing, but the water content in the system increases to several thousands ppm or more after curing. In addition to this, other factors to lower the acidity are involved, such as decrease of the anion polymerization stabilizer during curing and dissolution of impurities on the surface of substrates to be bonded.

The acidity of the 2-cyanoacrylate-based composition that is typically strongly acidic in the system due to a polymerization inhibitor is a little reduced by these changes. It is presumed that when a suitable pH indicator which color change region partly or wholly overlaps pH 1 to 4 is blended with the system, the composition exhibits a color of the acidic side of the blended coloring material before curing, and a color of the alkaline side thereof after curing.

Moreover, the cured product of the 2-cyanoacrylate-based composition after curing is estimated to have a pH corresponding to 2.5 to 5. Therefore, some pH indicators, which have no color change region within the above pH of 1 to 4 or exhibit no color in a water-deficient state before curing, exhibit color at the pH of 2.5 to 5 in the cured product of the 2-cyanoacrylate-based composition. Utilizing these properties, it is possible to achieve change of colors from colored state to colorless state, from colored state to colored state, or from colorless state to colored state as described above.

Hereinafter, the present invention will be described further in detail with reference to examples and comparative examples, but the present invention is not limited to these examples.

Methods of evaluation were as follows:

(1) Measuring Method of Set Time

The set time was measured according to JIS K 6861-1995 using test pieces made of a rigid polyvinyl chloride resin.

(2) Measuring Method of Adhesion Strength (Rigid Polyvinyl Chloride Resin)

Test pieces made of a rigid polyvinyl chloride resin having a dimension to be used for the tensile shear adhesion strength test according to JIS K 6861-1995 were glued together with an adhesive composition, cured for 24 hours and then subjected to the tensile shear adhesion strength test.

(3) Appearance (Appearance of Liquid)

In order to observe appearance of liquid in coated state, a liquid was coated on a white polyacetal resin sheet in a thickness of about 0.5 mm, which is similar to the state where one drop (about 0.02 g) was coated on a substrate, and then appearance was observed.

(Appearance of Cured Product)

Similar to the above for the appearance of liquid in coated state, a liquid was coated on a white polyacetal resin sheet in a thickness of about 0.5 mm, and after it was stood for 24 hours at 25° C.×60% RH and completely cured, appearance was observed.

EXAMPLE 1

A 2-cyanoacrylate-based composition was prepared by mixing pentamethoxy red with ethyl-2-cyanoacrylate (supplemented with 50 ppm of sulfur dioxide) to make the content of pentamethoxy red 1 ppm, and was used for the above described evaluation. The results were shown in Table 1.

EXAMPLE 2

A 2-cyanoacrylate-based composition was prepared by mixing pentamethoxy red with the same ethyl-2-cyanoacrylate as Example 1 to make the content of pentamethoxy red 10 ppm, and was used for the above described evaluation. The results were shown in Table 1.

EXAMPLE 3

A 2-cyanoacrylate-based composition was prepared by mixing pentamethoxy red with the same ethyl-2-cyanoacrylate as Example 1 to make the content of pentamethoxy red 100 ppm, and was used for the above described evaluation. The results were shown in Table 1.

EXAMPLE 4

A 2-cyanoacrylate-based composition was prepared by mixing pentamethoxy red with the same ethyl-2-cyanoacrylate as Example 1 to make the content of pentamethoxy red, 1,000 ppm, and was used for the above described evaluation. The results were shown in Table 1.

EXAMPLE 5

A 2-cyanoacrylate-based composition was prepared by mixing bromothymol blue with the same ethyl-2-cyanoacrylate as Example 1 to make the content of bromothymol blue 10 ppm, and was used for the above described evaluation. The results were shown in Table 1.

EXAMPLE 6

A 2-cyanoacrylate-based composition was prepared by mixing bromothymol blue with the same ethyl-2-cyanoacrylate as Example 1 to make the content of bromothymol blue 100 ppm, and was used for the above described evaluation. The results were shown in Table 1.

EXAMPLE 7

A 2-cyanoacrylate-based composition was prepared by mixing bromothymol blue with the same ethyl-2-cyanoacrylate as Example 1 to make the content of bromothymol blue 1,000 ppm, and was used for the above described evaluation. The results were shown in Table 1.

EXAMPLE 8

A 2-cyanoacrylate-based composition was prepared by mixing methyl yellow with the same ethyl-2-cyanoacrylate as Example 1 to make the content of methyl yellow 10 ppm, and was used for the above described evaluation. The results were shown in Table 1.

EXAMPLE 9

A 2-cyanoacrylate-based composition was prepared by mixing methyl yellow with the same ethyl-2-cyanoacrylate as Example 1 to make the content of methyl yellow 100 ppm, and was used for the above described evaluation. The results were shown in Table 1.

EXAMPLE 10

A 2-cyanoacrylate-based composition was prepared by mixing methyl yellow with the same ethyl-2-cyanoacrylate as Example 1 to make the content of methyl yellow 1,000 ppm, and was used for the above described evaluation. The results were shown in Table 1.

EXAMPLE 11

A 2-cyanoacrylate-based composition was prepared by pentamethoxy red with ethyl-2-cyanoacrylate (supplemented with 100 ppm of $BF_3$-methanol complex) to make the content of pentamethoxy red 100 ppm, and was used for the above described evaluation. The results were shown in Table 1.

EXAMPLE 12

A 2-cyanoacrylate-based composition was prepared by mixing bromothymol blue with the same ethyl-2-cyanoacrylate as Example 11 to make the content of bromothymol blue 100 ppm, and was used for the above described evaluation. The results were shown in Table 1.

EXAMPLE 13

A 2-cyanoacrylate-based composition was prepared by mixing methyl yellow with the same ethyl-2-cyanoacrylate as Example 11 to make the content of methyl yellow 100 ppm, and was used for the above described evaluation. The results were shown in Table 1.

EXAMPLE 14

A 2-cyanoacrylate-based composition was prepared by mixing pentamethoxy red with isopropyl-2-cyanoacrylate (supplemented with 50 ppm of sulfur dioxide) to make the content of pentamethoxy red 100 ppm, and was used for the above described evaluation. The results were shown in Table 1.

EXAMPLE 15

A 2-cyanoacrylate-based composition was prepared by mixing bromothymol blue with the same isopropyl-2-cyanoacrylate as Example 14 to make the content of bromothymol blue 100 ppm, and was used for the above described evaluation. The results were shown in Table 1.

EXAMPLE 16

A 2-cyanoacrylate-based composition was prepared by mixing methyl yellow with the same isopropyl-2-cyanoacrylate as Example 14 to make the content of methyl yellow 100 ppm, and was used for the above described evaluation. The results were shown in Table 1.

A 2-cyanoacrylate-based composition was prepared by mixing pentamethoxy red with ethoxyethyl-2-cyanoacrylate (supplemented with 50 ppm of sulfur dioxide) to make the content of pentamethoxy red 100 ppm, and was used for the above described evaluation. The results were shown in Table 1.

EXAMPLE 18

A 2-cyanoacrylate-based composition was prepared by mixing bromothymol blue with the same ethoxyethyl-2-cyanoacrylate as Example 17 to make the content of bromothymol blue 100 ppm, and was used for the above described evaluation. The results were shown in Table 1.

EXAMPLE 19

A 2-cyanoacrylate-based composition was prepared by mixing methyl yellow with the same ethoxyethyl-2-cyanoacrylate as Example 17 to make the content of methyl yellow 100 ppm, and was used for the above described evaluation. The results were shown in Table 1.

EXAMPLE 20

A 2-cyanoacrylate-based composition was prepared by mixing pentamethoxy red and crown ether O-18 with the same ethyl-2-cyanoacrylate as Example 11 to make the content of pentamethoxy red 50 ppm and the content of crown ether O-18 500 ppm, and was used for the above described evaluation. The results were shown in Table 1.

EXAMPLE 21

A 2-cyanoacrylate-based composition was prepared by mixing pentamethoxy red, crown ether O-18 and polymethylmethacrylate (molecular weight 1,000,000) with the same ethyl-2-cyanoacrylate as Example 11 to make the content of pentamethoxy red 50 ppm, the content of crown ether O-18 500 ppm and the content of polymethylmethacrylate 4% by weight, and was used for the above described evaluation. The results were shown in Table 1.

EXAMPLE 22

A 2-cyanoacrylate-based composition was prepared by mixing pentamethoxy red, crown ether O-18 and dipentaerythritol hexaacrylate with the same ethyl-2-cyanoacrylate as Example 11 to make the content of pentamethoxy red 50 ppm, the content of crown ether O-18 500 ppm and the content of dipentaerythritol hexaacrylate 5% by weight, and was used for the above described evaluation. The results were shown in Table 1.

EXAMPLE 23

A 2-cyanoacrylate-based composition was prepared by mixing pentamethoxy red, crown ether O-18 and dimethyl phthalate with the same ethyl-2-cyanoacrylate as Example 11 to make the content of pentamethoxy red 50 ppm, the content of crown ether O-18 500 ppm and the content of dimethyl phthalate 5% by weight, and was used for the above described evaluation. The results were shown in Table 1.

EXAMPLE 24

A 2-cyanoacrylate-based composition was prepared by mixing pentamethoxy red, crown ether O-18 and acetyl tributyl citrate with the same ethyl-2-cyanoacrylate as Example 11 to make the content of pentamethoxy red 50 ppm, the content of crown ether O-18 500 ppm and the content of acetyl tributyl citrate 5% by weight, and was used for the above described evaluation. The results were shown in Table 1.

COMPARATIVE EXAMPLE 1

Ethyl-2-cyanoacrylate with which no coloring material was blended (supplemented with 50 ppm of sulfur dioxide) was used for the above described evaluation. The results were shown in Table 1.

COMPARATIVE EXAMPLE 2

Ethyl-2-cyanoacrylate with which no coloring material was blended (supplemented with 100 ppm of $BF_3$-methanol complex) was used for the above described evaluation. The results were shown in Table 1.

COMPARATIVE EXAMPLE 3

Isopropyl-2-cyanoacrylate with which no coloring material was blended (supplemented with 50 ppm of sulfur dioxide) was used for the above described evaluation. The results were shown in Table 1.

COMPARATIVE EXAMPLE 4

Ethoxyethyl-2-cyanoacrylate with which no coloring material was blended (supplemented with 50 ppm of sulfur dioxide) was used for the above described evaluation. The results were shown in Table 1.

COMPARATIVE EXAMPLE 5

An adhesive composition was prepared by mixing Macrolex Red (trade name of Bayer AG) with the same ethyl-2-cyanoacrylate as Comparative Example 1 to make the content of the Macrolex Red 100 ppm, and was used for the above described evaluation. The results were shown in Table 1.

COMPARATIVE EXAMPLE 6

An adhesive composition was prepared by mixing Macrolex Red with the same ethyl-2-cyanoacrylate as Comparative Example 2 to make the content of the Macrolex Red 100 ppm, and was used for the above described evaluation. The results were shown in Table 1.

COMPARATIVE EXAMPLE 7

An adhesive composition was prepared by mixing Macrolex Red with the same isopropyl-2-cyanoacrylate as Comparative Example 3 to make the content of the Macrolex Red 100 ppm, and was used for the above described evaluation. The results were shown in Table 1.

COMPARATIVE EXAMPLE 8

An adhesive composition was prepared by mixing Macrolex Red with the same ethoxyethyl-2-cyanoacrylate as Comparative Example 4 to make the content of the Macrolex Red 100 ppm, and was used for the above described evaluation. The results were shown in Table 1.

TABLE 1

| | Rigid PVC adhesion test | | | |
|---|---|---|---|---|
| | Set time | Adhesion strength (N/mm$^2$) | Appearance | |
| | (sec) | Initial | Liquid | Cured product |
| Example 1 | 10 | 3.3 | Light purple | Colorless |
| Example 2 | 10 | 3.3 | Purple | Colorless |
| Example 3 | 5 | 3.3 | Purple | Colorless |
| Example 4 | 5 | 3.2 | Deep purple | Light purple |
| Example 5 | 10 | 3.3 | Colorless | Light yellow |
| Example 6 | 10 | 3.2 | Colorless | Yellow |
| Example 7 | 20 | 3.0 | Colorless | Yellow |
| Example 8 | 10 | 3.2 | Red | Yellow |
| Example 9 | 5 | 3.3 | Red | Yellow |
| Example 10 | 3 | 3.1 | Red | Yellow |
| Example 11 | 5 | 3.3 | Purple | Colorless |
| Example 12 | 10 | 3.3 | Colorless | Yellow |
| Example 13 | 5 | 3.3 | Red | Yellow |
| Example 14 | 10 | 3.2 | Purple | Colorless |
| Example 15 | 20 | 3.1 | Colorless | Yellow |
| Example 16 | 5 | 3.2 | Red | Yellow |
| Example 17 | 20 | 3.1 | Purple | Colorless |
| Example 18 | 30 | 3.0 | Colorless | Yellow |
| Example 19 | 10 | 3.0 | Red | Yellow |
| Example 20 | 3 | 3.3 | Purple | Colorless |
| Example 21 | 3 | 3.3 | Purple | Colorless |
| Example 22 | 3 | 2.8 | Purple | Colorless |
| Example 23 | 3 | 2.9 | Purple | Colorless |
| Example 24 | 3 | 3.1 | Purple | Colorless |
| Comparative Example 1 | 5 | 3.2 | Colorless | Colorless |
| Comparative Example 2 | 5 | 3.3 | Colorless | Colorless |
| Comparative Example 3 | 10 | 3.1 | Colorless | Colorless |
| Comparative Example 4 | 20 | 3.1 | Colorless | Colorless |
| Comparative Example 5 | 10 | 3.2 | Red | Red |
| Comparative Example 6 | 10 | 3.3 | Red | Red |
| Comparative Example 7 | 20 | 3.1 | Red | Red |
| Comparative Example 8 | 30 | 2.9 | Red | Red |

As shown in each Example in Table 1, it has been found that the 2-cyanoacrylate-based composition of the present invention has different colors between before and after curing. Moreover, it has been found that the curing performance of the composition mixed with a coloring material in a suitably selected amount can be maintained at the same level as that of the composition mixed with no coloring material.

On the other hand, in comparative examples in Table 1, all compositions are transparent and colorless both before and after curing when no coloring material is added. Moreover, when any coloring material is added, all compositions are colored in the same color both before and after curing, and the color change effect of the present invention was not be observed.

INDUSTRIAL APPLICABILITY

The preferable 2-cyanoacrylate-based composition of the present invention is excellent in visibility and workability as it is colored before curing, and provides bonded, filled or surface treated portions with good appearance as it becomes colorless or light-colored after curing. For this reason, the composition has excellent workability as well as good finished-quality. Thus, it provides coating workability and curability that are balanced in a high level for industries and households, particularly for applications in which accuracy is required. Further, since the composition allows good work, it can be used further widely in various fields. Furthermore, even when the composition is used by consumers poor in knowledge of adhesion, filling or surface treatment, the location and amount of application can be easily determined and they can work without any concern about the finished quality of the exposed part of the composition. So, the composition provides excellent usability and gives great effect to various industries.

The invention claimed is:

1. A method for determining curing of 2-cyanoacrylates, which consists essentially of blending, with a 2-cyanoacrylate, a coloring material that changes color with curing of the 2-cyanoacrylate, and curing the blend whereby curing is determined by said coloring material changing color, wherein the coloring material is a compound having a property of changing color with a change of pH, wherein the coloring material is selected from methyl yellow, methyl orange, methyl violet, pentamethoxy red and methyl red.

2. A method for determining curing of 2-cyanoacrylates according to claim 1, wherein the coloring material is methyl yellow.

3. A method for determining curing of 2-cyanoacrylates according to claim 1, wherein the coloring material is methyl orange.

4. A method for determining curing of 2-cyanoacrylates according to claim 1, wherein the coloring material is methyl violet.

5. A method for determining curing of 2-cyanoacrylates according to claim 1, wherein the coloring material is pentamethoxy red.

6. A method for determining curing of 2-cyanoacrylates according to claim 1, wherein the coloring material is methyl red.

7. A method for preparing a cured adhesive composition which consists essentially of blending, with a 2-cyanoacrylate, a coloring material that changes color with curing of the 2-cyanoacrylate, and curing the blend whereby curing is determined by said coloring material changing color, wherein the coloring material is a compound having a property of changing color with a change of pH, wherein the coloring material is selected from methyl yellow, methyl orange, methyl violet, pentamethoxy red and methyl red.

8. A method for preparing a cured adhesive composition according to claim 7, wherein the coloring material is methyl yellow.

9. A method for preparing a cured adhesive composition according to claim 7, wherein the coloring material is methyl orange.

10. A method for preparing a cured adhesive composition according to claim 7, wherein the coloring material is methyl violet.

11. A method for preparing a cured adhesive composition according to claim 7, wherein the coloring material is pentamethoxy red.

12. A method for preparing a cured adhesive composition according to claim 7, wherein the coloring material is methyl red.

* * * * *